(12) United States Patent
Baik et al.

(10) Patent No.: US 10,050,783 B2
(45) Date of Patent: Aug. 14, 2018

(54) QUANTUM RANDOM PULSE GENERATOR

(71) Applicant: EYL INC., Yongin-si (KR)

(72) Inventors: Jung Hyun Baik, Seongnam-si (KR);
Seong Joon Cho, Seongnam-si (KR);
Bu Suk Jeong, Yongin-si (KR); Dae Hyun Nam, Seoul (KR)

(73) Assignee: EYL INC., Gyeonggi-Do (KR)

( * ) Notice: Subject to any disclaimer, the term of this patent is extended or adjusted under 35 U.S.C. 154(b) by 0 days.

(21) Appl. No.: 15/648,921

(22) Filed: Jul. 13, 2017

(65) Prior Publication Data

US 2017/0346626 A1 Nov. 30, 2017

Related U.S. Application Data

(63) Continuation of application No. PCT/KR2017/002654, filed on Mar. 13, 2017.

(30) Foreign Application Priority Data

May 31, 2016 (KR) .......................... 10-2016-0067599

(51) Int. Cl.
| | |
|---|---|
| H04L 9/08 | (2006.01) |
| H03K 3/84 | (2006.01) |
| G06F 7/58 | (2006.01) |
| H01L 33/04 | (2010.01) |

(52) U.S. Cl.
CPC ............ *H04L 9/0852* (2013.01); *G06F 7/588* (2013.01); *H03K 3/84* (2013.01); *H01L 33/04* (2013.01)

(58) Field of Classification Search
None
See application file for complete search history.

(56) References Cited

U.S. PATENT DOCUMENTS

| | | | |
|---|---|---|---|
| 9,529,570 B2 * | 12/2016 | Anderson | ............... G06F 7/588 |
| 2006/0255991 A1 * | 11/2006 | De Abreu | ............ H01M 10/44 |
| | | | 341/143 |
| 2007/0271320 A1 * | 11/2007 | Tsuyuzaki | ............... G06F 7/588 |
| | | | 708/251 |
| 2015/0331672 A1 * | 11/2015 | Yuan | ....................... H01S 5/065 |
| | | | 359/107 |

(Continued)

FOREIGN PATENT DOCUMENTS

| | | |
|---|---|---|
| JP | 09050369 | 2/1997 |
| JP | 11161473 | 6/1999 |
| JP | 201117758 | 4/2001 |

(Continued)

*Primary Examiner* — Michael R Vaughan
(74) *Attorney, Agent, or Firm* — Cantor Colburn LLP

(57) ABSTRACT

Provided is a quantum random pulse generator having enhanced security using a phenomenon in which a radioactive isotope naturally collapses. The quantum random pulse generator includes a photodiode detection unit which has a photodiode disposed at the center of the photodiode detection unit on a top surface, a radioactive isotope emission unit which emits alpha particles discharged when an atomic nucleus naturally collapses toward a photodiode, and a plate which is disposed on a top surface of the radioactive isotope emission unit and supports the radioactive isotope emission unit. The alpha particles discharged by the emission unit come into contact with the photodiode to generate a random pulse.

3 Claims, 3 Drawing Sheets

(56) References Cited

U.S. PATENT DOCUMENTS

2018/0067724 A1* 3/2018 Baik ...................... H04N 5/374
2018/0068305 A1* 3/2018 Baik .................... G06Q 20/385

FOREIGN PATENT DOCUMENTS

| | | |
|---|---|---|
| JP | 2014219360 | 11/2014 |
| KR | 20010067247 | 7/2001 |
| KR | 101244853 | 3/2013 |
| KR | 20150011284 | 1/2015 |

* cited by examiner (a)

(b)

QUANTUM RANDOM PULSE GENERATOR

TECHNICAL FIELD

The present invention relates to a quantum random pulse generator and, more particularly, to a quantum random pulse generator for a device which generates a natural random number using a phenomenon in which a radioactive isotope naturally collapses or uses a random pulse as a trigger signal or an interrupt signal.

BACKGROUND ART

The Internet of Things (IoT), that is, a system in which things in life are connected over wired and wireless networks and information is exchanged, is generalized. The IoT is a thing space connection network over which intelligent relations, such as sensing, networking and information processing, are cooperatively formed without the explicit intervention of the human being with respect to three distributed environmental elements, such as the human being, things and services.

As the IoT is generalized, a security threat also increases. For IoT security, security not having disconnection for the entire section from an IoT device to a system is required. In particular, the IoT is exposed to a greater security threat because devices having various functions and protocols have to communicate with each other and thus an open type standard technology needs to be used.

Meanwhile, a software-based random number generation technology has a problem in that a random number generation pattern can be checked using an advanced hacking technology in addition to lots of resources.

Accordingly, a natural random number or a true random number extracted from the randomness of a natural phenomenon for security between IoT devices is requested. This has an advantage in that a specific pattern is not present and cannot be predicted, but has a problem in that it is difficult to apply to a small-sized device because the size is very large, such a method is very expensive and an extraction apparatus is required.

Related prior arts include Korean Patent Application Publication No. 10-2015-0011284 "Immobilizer apparatus using random pulse generation and authentication method thereof" and Korean Patent No. 10-1244853 "Integration authentication method for user using random pulse generation."

DISCLOSURE

Technical Problem

An object of the present invention is to provide a quantum random pulse generator for producing a small natural random number generator having enhanced security using a phenomenon in which a radioactive isotope naturally collapses.

Technical Solution

A quantum random pulse generator according to an embodiment of the present invention includes a photodiode detection unit which has a photodiode disposed at the center of the photodiode detection unit on a top surface, a radioactive isotope emission unit which emits alpha particles discharged when an atomic nucleus naturally collapses toward a photodiode, and a plate which is disposed on a top surface of the radioactive isotope emission unit and supports the radioactive isotope emission unit. The alpha particles discharged by the emission unit come into contact with the photodiode to generate a random pulse.

Advantageous Effects

In accordance with the present invention, security between devices can be enhanced by generating a natural random number using a phenomenon in which a radioactive isotope naturally collapses or applying a random signal to a desired device.

In accordance with the present invention, the natural random number generator using the quantum random pulse generator provides an encryption key used in an encryption module and an authentication number. Accordingly, security and authentication can be enhanced and convenience can be improved because disadvantages of a pseudo random number are overcome.

In accordance with the present invention, the security and lightweightness of an IoT device can be improved because the size of the quantum random pulse generator can be implemented in a smaller and thinner thin film form.

MODE FOR INVENTION

Figure 1:
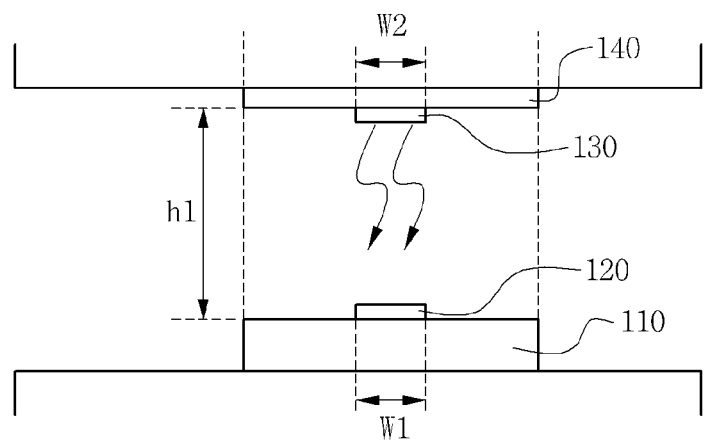
FIG. 1 is a diagram for illustrating a quantum random pulse generator according to an embodiment of the present invention.

A specific structural or functional description of embodiments according to the concept of the present invention this specification has been merely illustrated for the purpose of describing the embodiments according to the concept of the present invention, and the embodiments according to the concept of the present invention may be implemented in various forms and are not limited to embodiments described in this specification.

The embodiments according to the concept of the present invention may be changed in various ways and may have various forms, and thus the embodiments are illustrated in the drawings and described in detail in this specification. However, this is not intended to limit the embodiments according to the concept of the present invention to specific disclosed forms and includes all of changes, equivalents or substitutes included in the spirit and technical scope of the present invention.

The terms used in this application are used to only describe specific embodiments and are not intended to restrict the present invention. An expression of the singular number includes an expression of the plural number unless clearly defined otherwise in the context. In this specification, terms, such as "include" or "have", are intended to designate that characteristics, numbers, steps, operations, elements, or parts which are described in the specification, or a combination of them exist, and should not be understood that they exclude the existence or possible addition of one or more other characteristics, numbers, steps, operations, elements, parts, or combinations of them in advance.

Hereinafter, the embodiments of the present invention are described in detail with reference to the drawings attached to this specification.

FIG. 1 is a diagram for illustrating a quantum random pulse generator according to an embodiment of the present invention.

Referring to FIG. 1, the quantum random pulse generator 100 according to an embodiment of the present invention includes a photodiode detection unit 110, a photodiode 120, a radioactive isotope emission unit 130 and a plate 140.

The photodiode 120 may be disposed at the central part of the photodiode detection unit 110 on a top surface of the photodiode detection unit 110. The photodiode detection unit 110 may be formed on a substrate. The type of substrate is not specially limited and may be a silicon, zinc oxide or nitride semiconductor substrate, for example.

The photodiode 120 may collide against alpha particles emitted by the radioactive isotope emission unit 130. The photodiode detection unit 110 may detect an event from the photodiode 120 and generate a random pulse. The random pulse may generate in accordance with the emission time of the alpha particles.

The radioactive isotope emission unit 130 may emit the alpha particles discharged when an atomic nucleus naturally collapses. The alpha particles may be $Am^{241}$ that naturally collapses, but is not limited thereto. For example, the alpha particles may be at least one of $Pb^{210}$ isotope that is a uranium emission, $Cm^{244}$ and $Po^{210}$.

The radioactive isotope emission unit 130 may be disposed to face the photodiode 120 at a specific interval. The horizontal width W1 of the photodiode 120 and the horizontal width W2 of the radioactive isotope emission unit 130 may be the same, but is not limited thereto. The horizontal width W1 of the photodiode 120 may be 0.1 mm or more and 1.0 mm or less, and the horizontal width W2 of the radioactive isotope emission unit 130 may be 0.1 mm or more and 1.0 mm or less.

The plate 140 may be disposed on a top surface of the radioactive isotope emission unit 130 to support the radioactive isotope emission unit 130. An interval h1 between the photodiode detection unit 110 and the plate 140 may be 0.1 mm or more and 0.5 mm or less, but is not limited thereto.

The quantum random pulse generator 100 according to an embodiment of the present invention can be implemented in a smaller and thinner thin film form compared to a conventional quantum random pulse generator, thereby being capable of improving the security and lightweightness of an IoT device.

Figure 2:
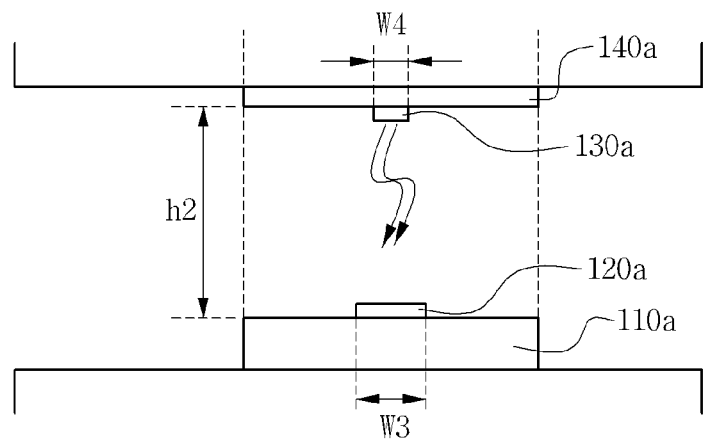
FIG. 2 is a diagram for illustrating a quantum random pulse generator according to another embodiment of the present invention.

FIG. 2 is a diagram for illustrating a quantum random pulse generator according to another embodiment of the present invention.

Referring to FIG. 2, the quantum random pulse generator 100a according to another embodiment of the present invention includes a photodiode detection unit 110a, a photodiode 120a, a radioactive isotope output unit 130a and a plate 140a.

The photodiode 120a may be disposed on a top surface of the photodiode detection unit 110a. The photodiode detection unit 110a may support the photodiode 120a. The photodiode detection unit 110a may be formed on a substrate. The type of substrate is not specially limited and may be a silicon, zinc oxide or nitride semiconductor substrate, for example.

The photodiode 120a may collide against alpha particles emitted by the radioactive isotope emission unit 130a. The photodiode detection unit 110a may detect an event from the photodiode 120a and generate a random pulse. The random pulse may be generated in accordance with the emission time of the alpha particles.

The radioactive isotope emission unit 130a may emit the alpha particles discharged when an atomic nucleus naturally collapses. The alpha particles may be $Am^{241}$ that naturally collapses, but is not limited thereto. For example, the alpha particles may be at least one of $Pb^{210}$ isotope that is a uranium emission, $Cm^{244}$ and $Po^{210}$.

The radioactive isotope emission unit 130a may be disposed to face the photodiode 120a at a specific interval. The horizontal width W4 of the radioactive isotope emission unit 130a may be smaller than the horizontal width W3 of the photodiode 120a. For example, the horizontal width W1 of the photodiode 120a may be 0.1 mm or more and 1.0 mm or less, and the horizontal width W2 of the radioactive isotope emission unit 130a may be more than 0.05 mm and less than 0.1 mm. An interval h2 between the photodiode detection unit 110a and the plate 140a may be 0.1 mm or more and 0.5 mm or less, but is not limited thereto.

Figure 3:
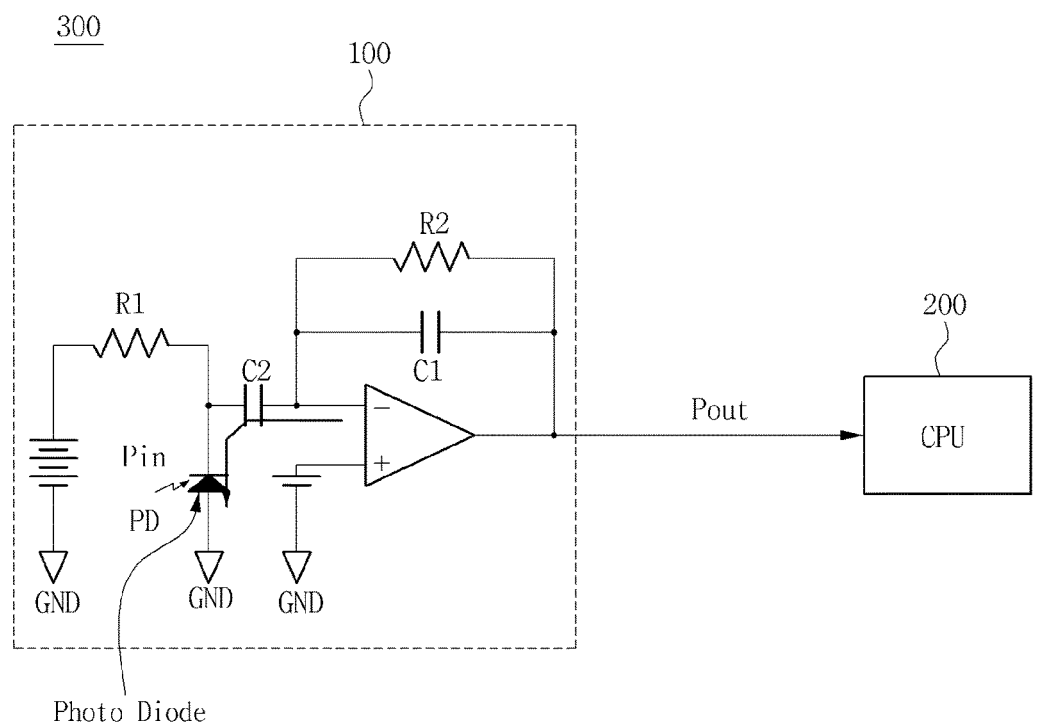
FIG. 3 is a circuit diagram showing the random number generation apparatus according to an embodiment of the present invention.

FIG. 3 is a circuit diagram showing the random number generation apparatus according to an embodiment of the present invention.

Referring to FIG. 3, the random number generation apparatus 300 according to an embodiment of the present invention includes the quantum random pulse generator 100 and a CPU 200.

The quantum random pulse generator 100 includes the photodiode PD which receives alpha particles from the radioactive isotope emission unit 130, resistors R1 and R2, capacitors C1 and C2 and an amplifier. The quantum random pulse generator 100 may send a generated random pulse to the CPU 200.

Figure 4:
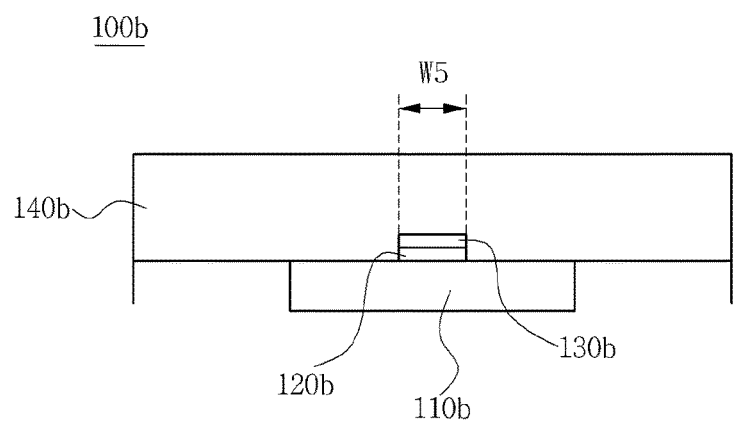
FIG. 4 is a diagram for illustrating a quantum random pulse generator according to yet another embodiment of the present invention.

FIG. 4 is a diagram for illustrating a quantum random pulse generator according to yet another embodiment of the present invention.

Referring to FIG. 4, the quantum random pulse generator 100b according to an embodiment of the present invention includes a photodiode detection unit 110b, a photodiode 120b, a radioactive isotope emission unit 130b of a form including a liquefied radioactive isotope, and a plate 140b.

The photodiode detection unit 110b may have the photodiode 120b disposed on its top and may support the photodiode 120b. The photodiode detection unit 110b may be formed on a substrate. The type of substrate is not specially limited and may be a silicon, zinc oxide or nitride semiconductor substrate, for example.

The photodiode 120b may be disposed to directly come into contact with the radioactive isotope emission unit 130b. The photodiode 120b may come into contact with alpha particles emitted by the radioactive isotope emission unit 130b. The photodiode detection unit 110b may detect an event from the photodiode 120b and generate a random pulse. The random pulse may be generated in accordance with the emission time of the alpha particles.

The radioactive isotope emission unit 130b may emit the alpha particles discharged when an atomic nucleus naturally collapses. The radioactive isotope emission unit 130b may be a liquefied form. The alpha particles may be $Am^{241}$ that naturally collapses, but is not limited thereto. For example, the alpha particles may be at least one of $Pb^{210}$ isotope that is a uranium emission, $Cm^{244}$ and $Po^{210}$.

The radioactive isotope emission unit 130b may be disposed on the photodiode 120b. The horizontal width W5 of the photodiode 120b and the radioactive isotope emission unit 130b may be the same, but is not limited thereto. The horizontal width W5 of the photodiode 120b and the radioactive isotope emission unit 130b may be 0.1 mm or more and 1.0 mm or less.

The plate 140b may be disposed to surround the photodiode 120b and the radioactive isotope emission unit 130b. That is, the plate 140b may be disposed on the substrate, the photodiode detection unit 110b, the photodiode 120b and the radioactive isotope emission unit 130b to seal the radioactive isotope emission unit 130b. Accordingly, radiation leaks to the outside of a chip can be prevented.

Figure 5:
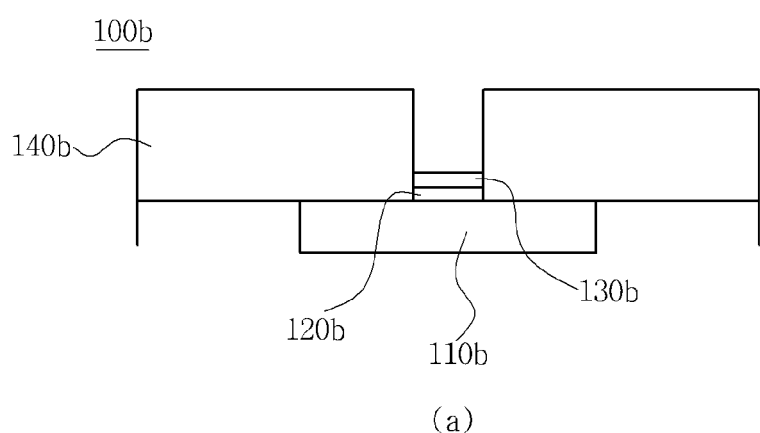
FIG. 5 is a diagram for illustrating a method for fabricating the quantum random pulse generator according to yet another embodiment of the present invention.
Figure 5:
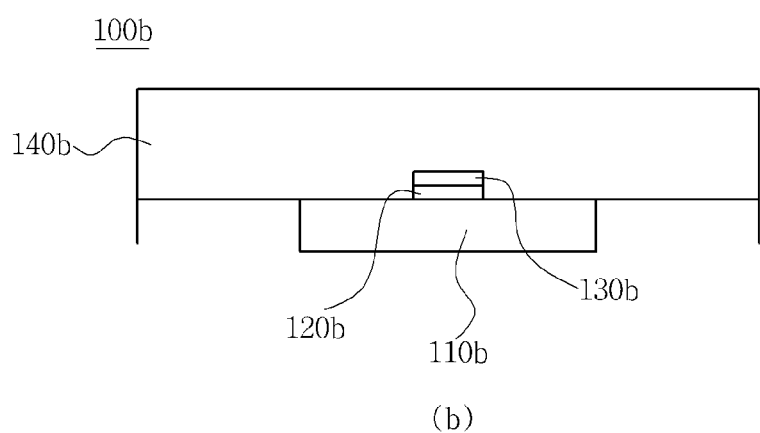

FIG. 5 is a diagram for illustrating a method for fabricating the quantum random pulse generator according to yet another embodiment of the present invention.

Referring to (a) of FIG. 5, in the quantum random pulse generator 100b, the photodiode detection unit 110b may be disposed within the substrate, and the plate 140b may be disposed on the substrate and the photodiode detection unit 110b. After the central part of the plate 140b experiences an etch process, the photodiode 120b may be disposed at the central part of the photodiode detection unit 110b on top thereof. Thereafter, the radioactive isotope emission unit 130b including a liquefied radioactive isotope may be disposed on the photodiode 120b. In this case, the radioactive isotope emission unit 130b may be a liquefied form, and alpha particles may be $Am^{241}$ that naturally collapses, but is not limited thereto.

Referring to (b) of FIG. 5, in the quantum random pulse generator 100b, after the radioactive isotope emission unit 130b is disposed, the plate 140b may be deposited to cover the radioactive isotope emission unit 130b including a liquefied radioactive isotope. That is, the plate 140b may be disposed on the substrate, the photodiode detection unit 110b, the photodiode 120b and the radioactive isotope emission unit 130b to seal the radioactive isotope emission unit 130b. Accordingly, radiation leaks to the outside of a chip can be prevented.

Although the embodiments of the present invention have been described with reference to the accompanying drawings, they are only illustrative. A person having ordinary skill in the art will understand that the present invention may be modified in various ways and that other equivalent embodiments of the present invention are possible. Accordingly, the true range of protection of the present invention should be determined by the following claims.

The invention claimed is:

1. A quantum random pulse generator, comprising:
   a photodiode detection unit which has a photodiode disposed at a center of the photodiode detection unit on a top surface;
   a radioactive isotope emission unit which emits alpha particles discharged when an atomic nucleus naturally collapses toward a photodiode; and
   a plate which is disposed on a top surface of the radioactive isotope emission unit and supports the radioactive isotope emission unit,
   wherein when the alpha particles emitted by the radioactive isotope emission unit come into contact with the photodiode, the photodiode detection unit detects an event from the photodiode and generates a random pulse,
   the random pulse is generated in accordance with an emission time of the alpha particles,
   a horizontal width of the radioactive isotope emission unit is smaller than a horizontal width of the photodiode, and
   an interval between the photodiode detection unit and the plate is 0.1 mm or more and 0.5 mm or less.

2. The quantum random pulse generator of claim 1, wherein:
   the horizontal width of the radioactive isotope emission unit is more than 0.05 mm and 0.1 mm or lower, and
   a horizontal width of the photodiode is 0.1 mm or more and 1.0 mm or less.

3. The quantum random pulse generator of claim 1, wherein the radioactive isotope emission unit comprises an $Am^{241}$ radioactive isotope.

* * * * *